(12) United States Patent
Wang et al.

(10) Patent No.: US 7,908,096 B2
(45) Date of Patent: Mar. 15, 2011

(54) INTEGRATED MICROMACHINED THERMAL MASS FLOW SENSOR AND METHODS OF MAKING THE SAME

(75) Inventors: Gaofeng Wang, San Jose, CA (US); Chih-Chang Chen, Cupertino, CA (US); Yahong Yao, Milpitas, CA (US); Liji Huang, San Jose, CA (US)

(73) Assignee: Siargo Ltd., Santa Clara, CA (US)

( * ) Notice: Subject to any disclaimer, the term of this patent is extended or adjusted under 35 U.S.C. 154(b) by 550 days.

(21) Appl. No.: 11/864,804

(22) Filed: Sep. 28, 2007

(65) Prior Publication Data

US 2009/0164163 A1    Jun. 25, 2009

(51) Int. Cl.
*G01F 1/00* (2006.01)
(52) U.S. Cl. ........................................................ 702/45
(58) Field of Classification Search ............... 702/45; 73/204.15; 385/5
See application file for complete search history.

(56) References Cited

U.S. PATENT DOCUMENTS

| | | | | |
|---|---|---|---|---|
| 6,752,014 B1 * | 6/2004 | Kanke et al. | | 73/204.15 |
| 2004/0211253 A1 * | 10/2004 | Horie et al. | | 73/204.15 |
| 2005/0100260 A1 * | 5/2005 | Yamazaki et al. | | 385/5 |

* cited by examiner

*Primary Examiner* — Drew A Dunn
*Assistant Examiner* — Xiuquin Sun (57) ABSTRACT

An integrated mass flow sensor is manufactured by a process of carrying out a micro-machining process on an N or P-type silicon substrate with orientation <100>. This mass flow sensor comprises an upstream thin-film heater, a downstream thin-film heater, and a pair of thin-film heat sensing elements, and a thermally isolated membrane for supporting the heaters and the sensors out of contact with the substrate base. This mass flow sensor is operated with three sets of circuits, a first circuit for measuring a flow rate in a first range of flow rates, a second circuit for measuring a flow rate in a second range of flow rates, and a third circuit in a differential configuration for measuring a flow rate in said first range of flow rates or said second range of flow rates, to significantly increase range of flow rate measurements and provide an optional for concentration measurement, while maintains a high degree of measurement accuracy.

11 Claims, 6 Drawing Sheets

FIG. 6

INTEGRATED MICROMACHINED THERMAL MASS FLOW SENSOR AND METHODS OF MAKING THE SAME

BACKGROUND OF THE INVENTION

1. Field of the Invention

The present invention generally concerns thermal mass flow sensors, and more particularly, concerns thermal mass flow sensors made of micro-electro-mechanical systems (MEMS) approach, and methods of manufacturing and operating such mass flow sensors.

2. Description of the Related Art

Heat transfer principle has been widely used for mass flow measurements. Thermal mass flow sensors can be found in many applications in industrial process monitor and control, medical gas flow management, and environmental equipments, to name a few. One of the major concerns on the traditional mass flow sensors is the large power consumption used to heating the fluid flow that leads to an uncertainty in low flow measurement domain and restrains on some applications such as gas trade metrology. The difficulties of making identical sensors also make manufacture cost higher than those for other technology. MEMS technology, on the contrary, allows fabrication of thermal mass flow sensors directly on silicon with excellent reproducibility, low power, and high reliability at low cost. MEMS-based thermal mass flow sensors have been received increasing attentions in flow measurement applications.

Thermal mass flow sensors can be classified into three basic categories: anemometers, calorimetric flow sensors, and time-of-flight sensors. For simplicity, these three types of thermal mass flow sensors are hereinafter abbreviated as A-, C-, and T-type mass flow sensors, respectively. Traditional T-type mass flow sensors, such as that disclosed in U.S. Pat. Nos. 5,339,695 and 5,347,876 (Kang), utilize hotwire set apart at a certain distance to measure the heat pulse flight time between two wires so that the fluid flow speed can be determined. Hariadi et al (I. Hariadi, H.-K. Trieu, W. Mokwa, H. Vogt, "Integrated Flow Sensor with Monocrystalline Silicon Membrane Operating in Thermal Time-of-Flight Mode," The 16th European Conference on Solid-State Transducers, Sep. 15-18, 2002, Prague, Czech Republic) disclose a time-of-flight flow sensor fabricated on Silicon-On-Insulator (SOI) wafers, in which heat pulse is fed to the fluid by a heater and a temperature sensor located downstream detects its delay. Measuring a flight time, the sensors give the velocity of the streaming fluid. However, the pulse will be deformed by the flow velocity profile and broaden at the same time by heat diffusion when it propagates down the stream. This means that the pulse tends to be too broad to be useful for slow flows and thus become inaccurate. Similar approaches have been adapted by U.S. Pat. Nos. 5,533,412 (Jerman) and 6,234,016 (Bonne).

Calorimetric flow sensors usually consist of a heater surrounded by temperature sensitive elements arranged symmetrically downstream and upstream. A moving fluid will carry away heat in the direction of flow and accordingly change the temperature distribution around the heater. The temperature difference between upstream and downstream is measured by the temperature sensitive elements. The output signal is commonly fetched using a Wheatstone bridge circuit, in which a pair of downstream and upstream sensing elements comprises two of its four branches. The output signal, which is a measure of temperature difference, is proportional to the flow velocity initially until a high flow velocity is reached where the temperature difference saturates and then decreases at higher flow velocity. In general, calorimetric flow sensors can accurately measure flows with extremely low velocities. However, calorimetric flow sensors may saturate at high flow velocities and hence have a difficulty to measure flows above a certain level of flow velocity. Many traditional thermal mass flow meters using capillary approach utilize this principle. Sensors made with this principle are disclosed such as in U.S. Pat. Nos. 5,014,552 (Kamiunten) and 6,550,324 (Mayer).

Jiang et al (F. Jiang, Y. C. Tai, C. M. Ho, and W. J. Li, "A Micromachined Polysilicon Hot-Wire Anemometer," Digest Solid-State Sensors & Actuator Workshop, Hilton Head, S.C., pp. 264-267, 1994) disclose a micro-machined A-type flow sensor comprising of a single element, which is heated and the heat loss of which is measured. This heat loss is dependent on the flow rate of the fluid. This heat loss increases with the flow velocity, and the signal of an anemometer is proportional to the square root of the flow velocity. In general, A-type mass flow sensors are less sensitive and extremely noisy in small flows and hence cannot measure small flows accurately. Nevertheless, A-type mass flow sensors have demonstrated that they are capable of accurately measuring flows with high velocities. Hinkle disclosed in U.S. Pat. No. 5,461,913 that in a capillary tube configuration, a pair of A-type sensor can be installed for improved performance, but yet this capillary by-pass configuration shall not apply to flow in a large conduit.

In summary, a major concern is how to extend the measurable flow rate range to the low flow rate and at the same time to the high flow rate within a single MEMS mass flow sensor. Specifically, for those of ordinary skill in the art there is still a need to provide a MEMS mass flow sensor to expand the measurable flow rate range to low flow velocities with sufficient accuracy and at the same time to keep its capability of accurately measuring flows with high velocities.

SUMMARY OF THE INVENTION

It is an object of the present invention to provide an integrated MEMS mass flow sensor with a large measurable flow rate range. In addition, the present invention further discloses the methods for making and operating the mass flow sensors.

According to the present invention, the single integrated MEMS mass flow sensor in a preferred embodiment consists of two identical A-type mass flow sensors, each of which is composed of a heater and a reference resistor. The two A-type mass flow sensors are placed along the flow path: one is at an upstream location and another is located at a downstream site. Each of the A-type mass flow sensors can provide a flow signal which depends on the flow rate. In particular, the signal from the upstream A-type mass flow is able to accurately and independently measuring flows with high velocities. In addition, a differential signal of the above two A-type flow signals will be able to measure low flow velocities with sufficient accuracy. Such a differential signal will be called the differential A-type signal hereinafter.

According to the present invention, the reference resistor in a preferred embodiment is at least three-time larger than resistance of its heater counterpart. With increased resistance of the reference resistor, the power consumption by heater control circuit shall be reduced by 30%~50%.

In accordance with the present invention, the integrated MEMS mass flow sensor in a preferred embodiment will also include a downstream temperature sensing element and a upstream temperature sensing element placed to surround the heaters to form a C-type mass flow sensor to give an additional flow signal, which is capable of independently measuring low flows with high accuracies.

In accordance with the present invention, all the three signals: one C-type flow signal, one A-type flow signal, and one differential A-type flow signal will be inputted into a microcontroller unit through multiple or multi-channel analog-to-digital converters (ADCs). All these three signals can be processed in the microcontroller unit to give unique indications on flow velocity and flow concentration simultaneously.

In accordance with the present invention, the upstream and downstream heaters and the upstream and downstream temperature sensing elements are formed on top surface of a suspending membrane to achieve good thermal isolation. The suspending membrane is typically made of thin dielectric films such as silicon nitride, silicon dioxide, etc. The suspending membrane structure can be formed by an anisotropic bulk etching from the back side of silicon wafer. The heaters and temperature sensing elements are preferred to be made of high TCR (temperature coefficient of resistance) materials, such as platinum (Pt), gold (Au), silicon carbide (SiC), etc. With the high TCR property, the temperature sensing elements can attain high sensitivity. A thin layer of silicon nitride material is deposited on top of the entire MEMS chip as passivation material.

These and other objects, features and advantages of the present invention will no doubt become apparent to those skilled in the art after reading the following detailed description of the preferred embodiments that are illustrated in the several accompanying drawings.

BRIEF DESCRIPTIONS OF THE DRAWINGS

The present invention can be better understood with reference to the following drawings. The components within the drawings are not necessarily to scale relative to each other, emphasis instead being placed upon clearly illustrating the principles of the present invention.

FIG. 3 is a circuitry illustration of a preferred differential A-type control circuit: (a) downstream A-type sensing bridge circuit; (b) differential configuration.

DETAILED DESCRIPTION OF THE PREFERRED EMBODIMENTS

Figure 1:
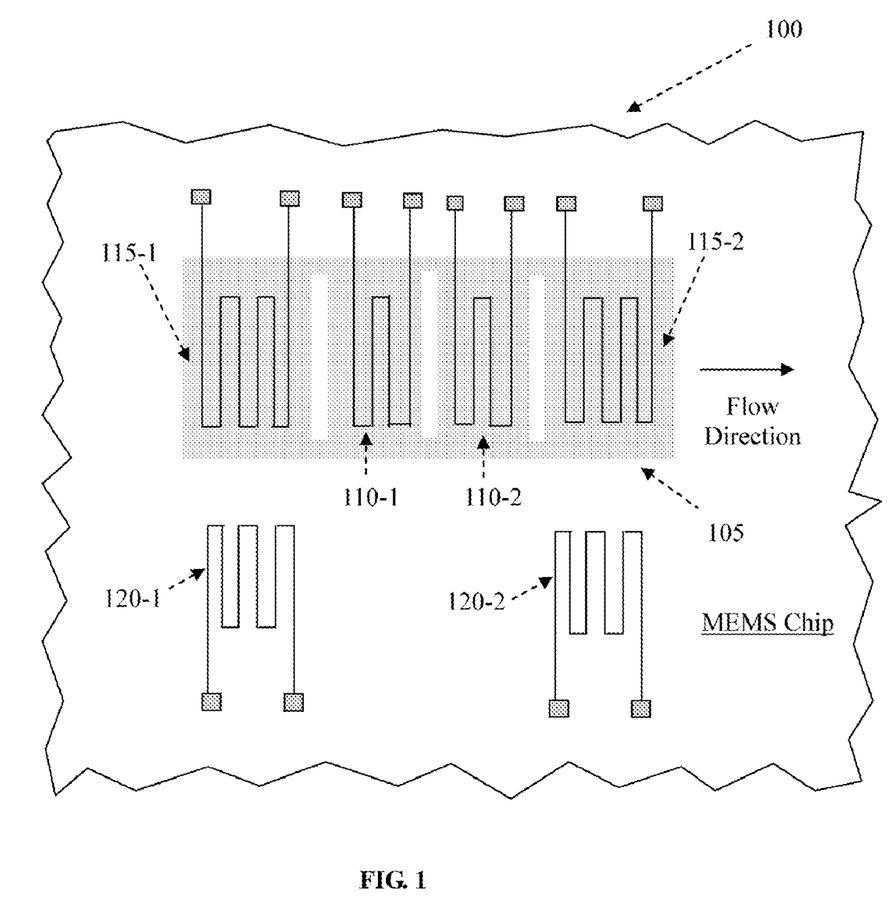
FIG. 1 is a top view illustration of a MEMS sensor chip of the present invention.

FIG. 1 shows a top view of a flow rate sensor 100 as a preferred embodiment of the present sensor. The flow rate sensor 100 is supported on a membrane 105 and is manufactured by applying the MEMS manufacturing processes as illustrated below. The flow rate sensor includes an upstream heater 110-1 and a downstream heater 110-2 as well as two temperature sensing resistors 115-1 and 115-2 disposed on the upstream and downstream respectively of the heaters 110-1 and 110-2. Each of the heaters 110-1 and 110-2 is a thin-film heating element and the temperature sensing resistors 115-1 and 115-2 is a pair of thin-film sensing resistors on a thin thermally isolated membrane 105 disposed over a micro-machined silicon substrate. The upstream and downstream sensing resistors 115-1 and 115-2 respectively may be symmetrical, i.e., resistors of equal resistance, or non-symmetrical resistors, i.e., resistors of different resistances. The upstream and downstream sensing resistors may be arranged to locate at either a symmetrical or non-symmetrical locations. The flow rate sensor further includes two reference resistors 120-1 and 120-2, both of which are thin-film ambient temperature sensing elements.

In the operation of the flow sensor, the heaters 110-1 and 110-2 are energized to produce temperature elevations at the central area that are considerably higher than the ambient temperature. A temperature gradient thus is produced from the heaters to edges of the membrane area. The sensing resistors 115-1 and 115-2 preferably made of materials, exhibiting a high resistance dependence on temperature, preferably a high thermal coefficient resistance (TCR) (e.g., 3000 ppm/° C.~8300 ppm/° C.). Accordingly, the resistances of the sensing resistors are caused to change in proportional to the temperature change in the area of the membrane containing the sensing resistors. The heaters 110-1 and 110-2 and reference resistors 120-1 and 120-2 preferably made of similar materials like the sensing resistors, exhibiting a high resistance dependence on temperature, preferably a high TCR. The reference resistors are located on the silicon substrate and thus their resistance changes with the ambient temperature.

As the flow moves along the direction from the upstream toward the downstream, it carries away heat from the heaters in the direction of flow. When the constant-temperature mode is used for controlling the two heaters, both heaters will consume more electrical powers for a larger flow rate. The measurements on the power consumptions in the two heaters will provide two A-type signals proportional to the flow rate. In particular, the A-type signal associated with the upstream heater can be used as an electrical signal for the flow rate. That is the principle of A-type flow sensing.

In addition, the heat carried away from the upstream heater flows down to the downstream heater, which will help the downstream heater to keep up with its temperature and hence reduce the power consumption of the downstream heater. The difference between the power consumptions between the upstream and downstream heaters will also be proportional to the flow rate, and thus provides a differential electrical signal for the flow rate. This is the principle of differential A-type flow sensing.

As the flow moves along the direction from the upstream toward the downstream, it changes the temperature distribution around the heaters. The temperature difference between upstream and downstream temperature sensing resistors can be measured by applying the sensing resistors 115-1 and 115-2. That is the principle of C-type flow sensing.

Figure 2:
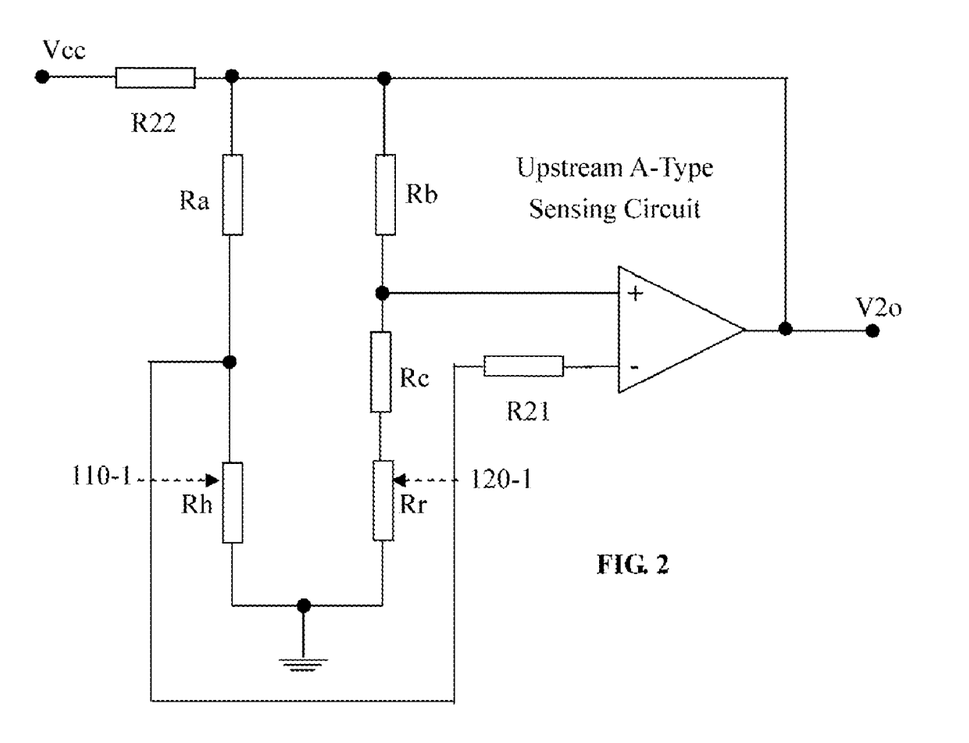
FIG. 2 is a circuitry illustration of a preferred A-type sensing bridge circuit.

FIG. 2 shows an improved Wheatstone bridge circuit for the A-type sensing implemented in a preferred embodiment of this invention. The Wheatstone bridge circuit includes two branches. A first branch includes the heater resistor Rh (i.e., 110-1) connected to a resistor Ra. A second branch includes the reference resistor Rr (i.e., 120-1) connected to two resistors Rc and Rb. The reference resistor Rr is formed on a silicon substrate and is applied to monitor the ambient temperature. The heater temperature Rh usually has a much higher temperature than the ambient temperature such as 70~300° C. to satisfy the bridge circuit balance requirement. The output voltage $V2o$ is a measure of heat loss from the upstream heater that is proportional to the flow velocity. Therefore, the voltage $V2o$ represents an A-type sensing signal. The flow sensing as shown in FIG. 2 is most suitable for high velocity flow to provide accurate mass flow rate measurement.

The circuit shown in FIG. 2 is also implemented as a constant temperature controlling circuit for controlling the heater Rh. The temperature of the heater above the ambient temperature is dependent on the resistor Rc and the ratio of the Rb/Ra. With predetermined values of these resistors, the heater temperature above the ambient temperature can be determined. The heater Rh and the reference resistor Rr are formed as thin film resistors on the membrane as shown in FIG. 1. The resistors Ra, Rb, Rc, and R21 can also be formed as thin film resistors on the substrate or alternately implemented as externally connected resistors. In the preferred embodiment as shown in FIG. 1, Ra, Rb, Rc, and R21 are implemented as externally connected resistors.

Figure 3A:
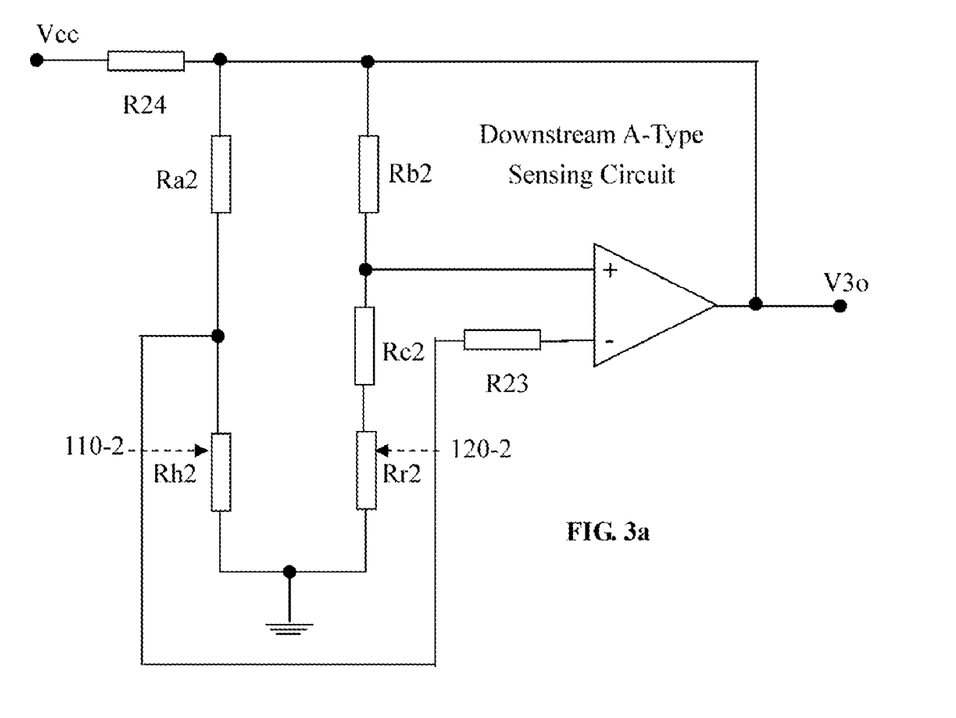
Figure 3B:
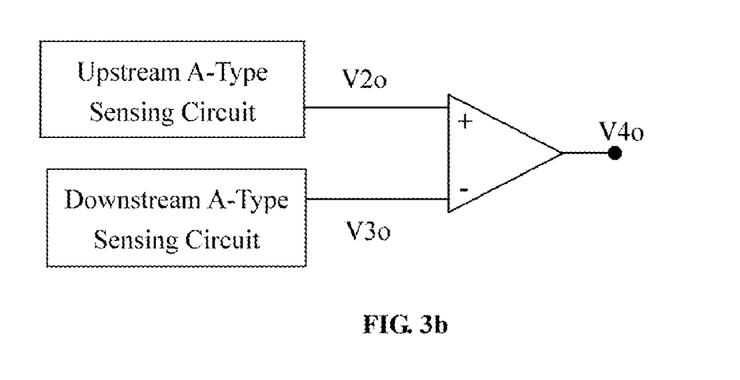

FIG. 3a and FIG. 3b show a circuitry differential configuration for the differential A-type sensing implemented in a preferred embodiment of this invention. This differential configuration consists of two A-type Wheatstone bridge circuits and a differential operational amplifier. One of the A-type Wheatstone bridge circuits is made of the heater resistor Rh, the reference resistor Rr, and other resistors Ra, Rb, Rc, R21, and R22, which is the circuit as shown in FIG. 2. Another A-type Wheatstone bridge circuit is made of the heater resistor Rh2 (i.e., 110-2), the reference resistor Rr2 (i.e., 120-2), and other resistors Ra2, Rb2, Rc2, R23, and R24, where Ra2=Ra, Rb2=Rb, Rc2=Rc, R23=R21, and R24=R22, as shown in FIG. 3a. The output voltage V4o=(V2o−V3o) is a measure of the heat loss difference between the upstream heater 110-1 and the downstream heater 110-2, which is proportional to the flow velocity. Hence, the voltage V4o represents a differential A-type sensing signal. The differential operation of V4o=(V2o−V3o) can be also realized in a microcontroller through firmware.

The differential A-type configuration shown in FIG. 3a and FIG. 3b has a strong rejection to environment noise due to common-mode noise cancellation between downstream and upstream. Therefore, the differential A-type sensing can give good accuracy to measurement of small flows, which is hardly to be measurable by the traditional A-type measurement mechanisms due to large noise-to-signal ratio during small measurements. Moreover, the differential A-type configuration is able to minimize the static offset effect through the subtraction between two A-type signals V2o and V3o.

Figure 4:
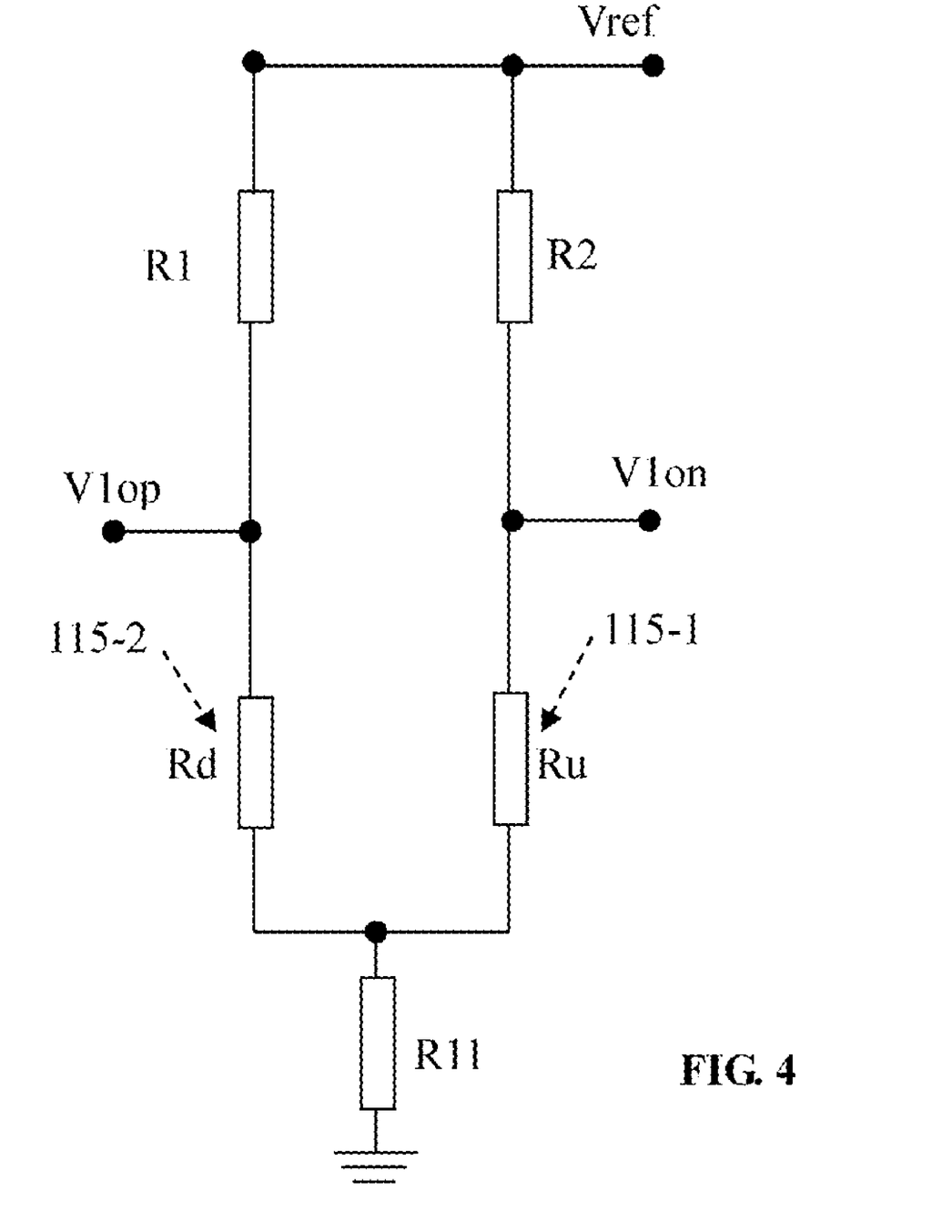
FIG. 4 is a circuitry illustration of a preferred C-type sensing bridge circuit.

FIG. 4 shows a Wheatstone bridge circuit implemented in a C-type flow sensing. In the Wheatstone bridge circuit, a first branch that includes a resistor R1 and the downstream resistor Rd (i.e., 115-2). The Wheatstone bridge circuit further includes a second branch that consists of a resistor R2 and the upstream resistor Ru (i.e., 115-1). A voltage difference V1o is measured at the midpoints, i.e., V1o=(Vlop−Vlon). The differential operation of V1o=(V1op−V1o) can be realized either via a hardware or in a microcontroller through firmware. This voltage difference Vlo represents a C-type sensing signal corresponding to the mass flow rate that causes the change of resistances in Rd, i.e., resistor 115-2, and Ru, i.e., resistor 115-1, due to temperature difference and thus generates the voltage difference. The voltage difference is proportional to the flow rate when the flow rate is below certain measurement saturation value. The voltage difference decreases when the flow speed is higher than the saturation value and the temperature difference as that represent by the voltage difference Vlo is no longer useful for mass flow measurement. The resistors R1, R2, and R11 can be implemented as part of thin film resistor formed on the substrate. The resistors R1, R2, and R11 can also be implemented as externally connected resistors for connection to Rd and Ru to form the Wheatstone bridge. According to FIG. 1, the resistors R1, R2, and R11 are implemented as externally connected resistors to the resistors 115-1 and 115-2 to form the Wheatstone bridge circuit shown in FIG. 4.

The C-type flow sensing implemented with the two-branch, Wheatstone circuit as shown in FIG. 4 uses a differential configuration and thus has strong rejection to environment noise due to common-mode noise cancellation between downstream and upstream. Therefore, the C-type sensing gives good accuracy to measurement of extremely small flows, which is hardly to be measurable by other measurement mechanisms due to extremely high noise-to-signal ratio during small measurements.

As mentioned above, the temperature difference between upstream and downstream saturates once a flow reaches a certain velocity level hereinafter this velocity is referred to as the saturation velocity level. When the flow velocity is greater than the saturation speed, the temperature difference is decreased with the increase of the flow rate. Thus, the C-type flow sensing is not applicable for a flow larger than saturation velocity level. In accordance with the present invention, the differential A-type flow sensing or the traditional A-type flow sensing will be employed for high flows beyond the saturation velocity level.

Figure 5:
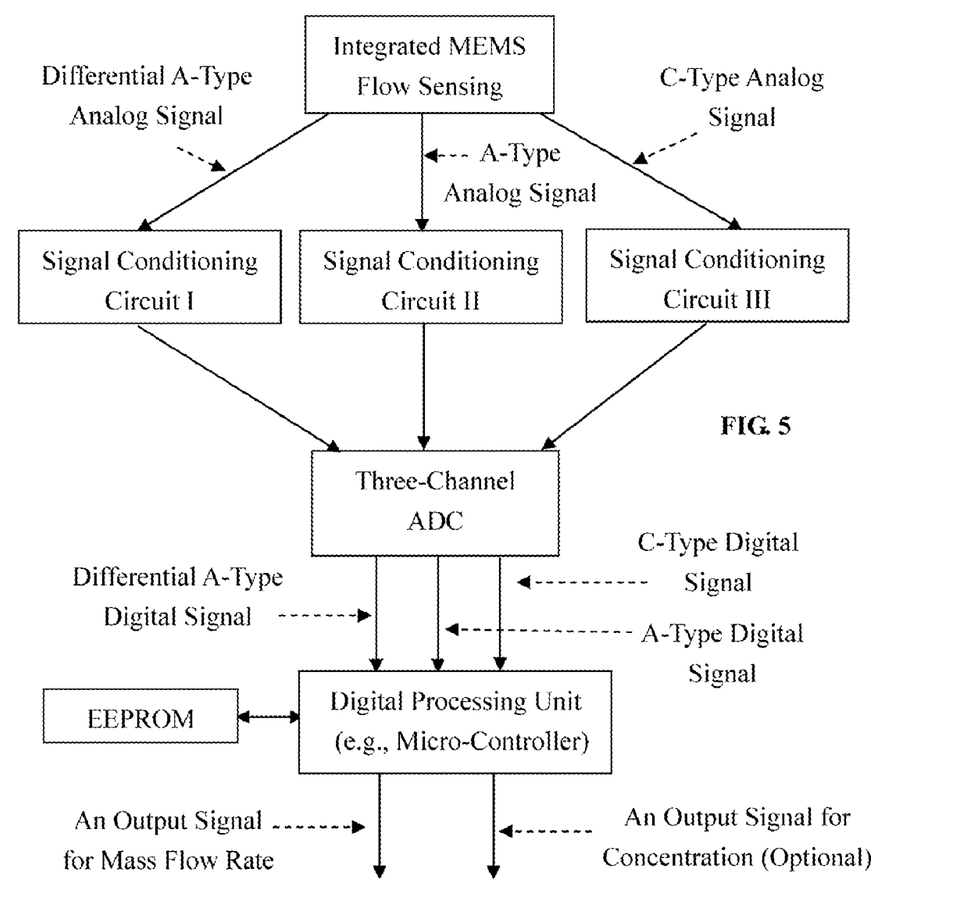
FIG. 5 is a functional block illustration of a preferred combined A-type, differential A-type, and C-type control circuits.

FIG. 5 is a functional block diagram to illustrate a three-channel implementation of a flow-sensing device of this invention. From a flow-'sensing module 100 as that shown in FIG. 1, with three types of controlling circuits shown in FIGS. 2, 3, and 4, three types of flow sensing signals are generated. As described above, the flow measurement signals generated, from the three types of controlling circuits are amplified and processed as conditioned analog signals by three separate electrical signal process circuits. The signal processing circuit carries out conditioning of the measurement signals including filtering of signal noises, adjusting the dynamical ranges, and amplifying the measurement signals. There are standard signal processing circuits commercially available for implementation of the flow rate sensors. The three amplified and processed analog signals are then sampled into three digital signals by a three-channel analog-to-digital device or three single-channel analog-to-digital devices, or other combinations of multi-channel analog-to-digital devices. These three digital signals are then imported into a digital processing unit, e.g., a micro-controller, for further processing.

The present invention describes an integrated MEMS mass flow sensor, which is capable of simultaneously combining differential A-type, conventional A-type, and C-Type operations to achieve significantly expanded measurable flow rate range. In addition, the present invention disclosed methods of operating such a high-performance integrated MEMS mass flow sensor.

In preferred embodiments of the present sensor, the three digital signals obtained from the differential (or downstream) A-type, upstream A-type, and C-type sensing signals via amplification, signal processing, and analog-to-digital conversions are processed by a digital processing unit and combined within this digital processing unit to provide a single measurement signal for the mass flow rate. Due to the A-type signals and the C-type signal have different dependencies on the fluid properties such as gas concentration in a gas mixture, an optional output signal can be provided for concentration measurement. Algorithms to generate such a single measurement signal for mass flow rate and/or a concentration measurement signal from the A-type and C-type digital signals are implemented either as a firmware or hardware within the digital processing unit.

In preferred embodiments of the present sensor, the digital processing unit monitors the differential A-type, upstream A-type, and C-type signals. The digital processing unit will, a priori, detect and record the characteristics of all the three signals, and is able to automatically switch between the differential A-type signal, the conventional A-type signal, and the C-type signal as well as seamlessly combine all three signals into a single measurement signal. As a consequence, the digital processing unit will use the differential A-type digital signal or the C-type digital signal for measurement of extremely small to medium flows, whereas employ the differential A-type digital signal or the conventional A-type digital signal for measurement of large flows. The conventional A-type digital signal contains plenty of concentration information, and be combined with the differential A-type or C-type digital signal to provide a concentration measurement signal.

According to FIG. 5, these three sets of signals are first recorded simultaneously during a calibration process and then be used in actual flow measurements. The signals obtained in the calibration process are initially recorded in a database table to correlate the mass flow rate to the signals measured and transmitted from the three types of controlling circuits. According to this database table, a program executed by the digital processing unit will determine which signal will be used in actual flow measurement.

The digital signal processing units are provided with different flow-rate computational programs to compute the flow rates by using the digital signals measured by the flow sensors and transmitted and processed from the three types of controlling circuits. The flow-rate versus the three-signal calibration data table obtained in a calibration process is also available as a database table for the flow rate computations when these flow rate programs are executed.

Figure 6:
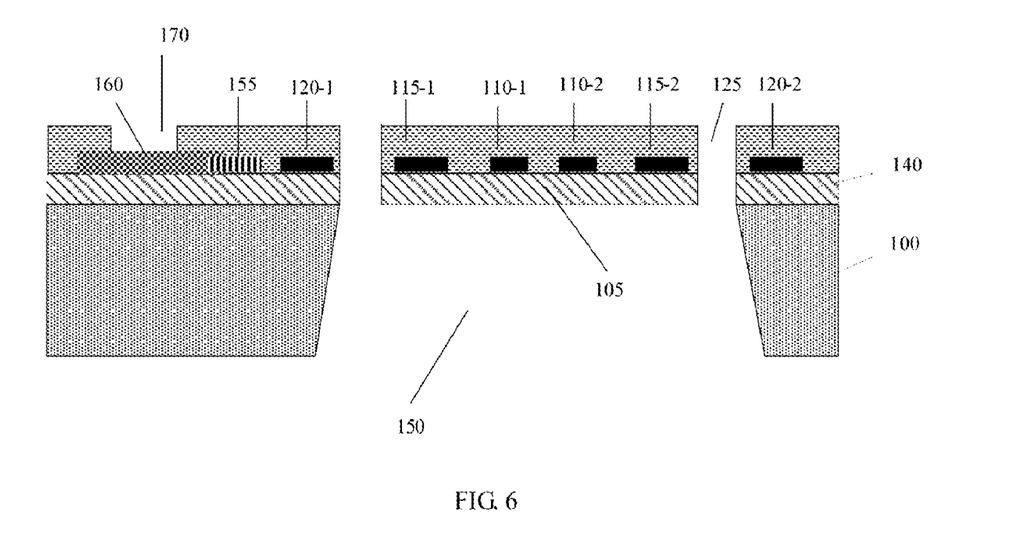
FIG. 6 is a cross section illustration of a preferred MEMS device.

Referring to FIG. 6, the heaters (110-1, 110-2), upstream sensing element (115-1), and downstream sensing element (115-2) are all disposed on a micromachined suspending membrane, which contains open slots (125) for improving heat isolation to substrate. The reference temperature sensing elements (120-1, 120-2) are located on the top of substrate to keep good thermal conductivity to the substrate. The temperature sensing elements (115-1, 115-2, 120-1, and 120-2) and heaters (110-1, 110-2) are all deposited by metal evaporation lift-off process to the top a silicon nitride layer (150) which is deposited by LPCVD process. The bonding pad (160) and interconnection metal (155) are also deposited by lift-off of metal evaporation process. The open slots (125) and bonding pad opening (170) are both achieved by reactive ion etch (RIE) in the same process. The cavity (150) underneath the suspending membrane structure is attained by silicon anisotropic bulk etching along the <111> crystal planes which forms angle of 54.7° to the bottom surface of silicon substrate. The etching solution for silicon anisotropic bulk etching is either TMAH (tetramethylanmonium hydroxide) or KOH (potassium hydroxide) solutions. Before performing the silicon bulk etching, hard masking and protection layers need to be deposited on bottom and top surfaces of silicon wafer respectively.

We claim:

1. An integrated mass flow rate sensor comprising:
a pair of upstream heating element and ambient temperature sensor connected to a first circuit for measuring a heat loss of said upstream heating element with reference to the ambient temperature for measuring a flow rate in a first range of flow rates; and
a pair of downstream heating element and ambient temperature sensor connected to a second circuit for measuring a heat loss of said downstream heating element with reference to the ambient temperature; and
a set of temperature sensors connected to a third circuit for measuring a temperature difference between an upstream and downstream temperature sensing elements for measuring a flow rate in a second range of flow rates;
wherein said first circuit, said second circuit and said third circuit are operated concurrently; and measurements of said first range of flow rates and said second range of flow rates are carried out simultaneously; and said first circuit and said second circuit are configured as a differential pair for common-mode noise rejection.

2. The integrated mass flow rate sensor of claim 1 wherein:
said first circuit and said second circuit are symmetrical configured; and
said first circuit and said second circuit are combined to form a fourth circuit in differential configuration for measuring the heat loss difference between said upstream heating element and said downstream heating element for measuring a flow rate in said first range or said second range of flow rates.

3. The integrated mass flow rate sensor of claim 2 wherein:
said first circuit, said third circuit, and said fourth (or second) circuit are further connected to a multiple-channel analog to digital converter (ADC) for converting multiple analog signals into multiple digital signals for processing by a digital processing unit.

4. The integrated mass flow rate sensor of claim 3 wherein:
said digital processing unit further includes a data storage device for storing a digital signal versus flow rate calibration table for determining a flow rate measurement by using a digital signal from said first circuit and a first corresponding signal from said ADC, or said third circuit and a second corresponding signal from said ADC, or said fourth circuit and a third corresponding signal from said ADC.

5. The integrated mass flow rate sensor of claim 1 wherein:
said first circuit, said second circuit, and said third circuit comprising respectively a first Wheatstone bridge circuit, a second Wheatstone bridge circuit, and a third Wheatstone bridge circuit.

6. The integrated mass flow rate sensor of claim 1 wherein:
said set of temperature sensors and said heating elements are disposed on a thermally isolated membrane extending over a hollow space under formed as a bulk-etched cavity in a silicon substrate; wherein said hollow space under said membrane as said bulk-etched cavity is a cavity opened from a bottom surface opposite said top surface along a <111> crystal plane.

7. The integrated mass flow rate sensor of claim 6 wherein:
said thermally isolated membrane is disposed on a top surface of said substrate and said hollow space under said membrane as said bulk-etched cavity is a cavity opened from a bottom surface opposite said top surface along a <111> crystal plane.

8. A method for measuring a mass flow rate comprising:
measuring a flow rate in a first range of flow rates by connecting a pair of upstream heating element and ambient temperature sensor to a first circuit for measuring a heat loss of said upstream heating element with reference to an ambient temperature; and
measuring a flow rate in a second range of flow rates by connecting a set of temperature sensors to a second circuit for measuring a temperature difference between upstream and downstream temperature sensing elements; and measuring a flow rate in a first range of flow rates or a second range of flow rates by connecting said pair of said upstream heating element and ambient temperature sensor and a pair of downstream heating element and ambient temperature sensor to a third circuit in differential configuration for measuring a heat loss difference between said upstream heating element and said downstream heating element; and wherein said first circuit, said second circuit and said third circuit are operated concurrently; and measurements of said first range of flow rates and said second range of flow rates are carried out simultaneously; and said first circuit and said second circuit are configured as a differential pair for common-mode noise rejection.

9. The method of claim 8 wherein:

said steps of connecting to said first circuit, said second circuit, and said third circuit respectively by connecting a first Wheatstone bridge circuit to said pair of said upstream heating element and ambient temperature sensor for measuring said mass flow rates in said first range of flow rate, connecting a second Wheatstone bridge circuit to said pair of said downstream heating element and ambient temperature sensor, and connecting a third Wheatstone bridge circuit to said set of temperature sensors for measuring said flow rate in said second ranges of flow rate.

10. The method of claim 8 wherein:

said step of connecting to a fourth circuit by connecting said first circuit and said second circuit to form a differential configuration for measuring said mass flow rates in said first range of flow rate or said second range of flow rate.

11. The method of claim 8 wherein:

said steps of connecting said set of temperature sensors, said pair of upstream heating element and ambient temperature sensor, and said pair of said downstream heating element and ambient temperature sensor further comprising a step of disposing said set of temperature sensors and said heating elements on a thermally isolated membrane extending over a hollow space underneath as a bulk-etched cavity in a substrate.

* * * * *